(12) United States Patent
Xie et al.

(10) Patent No.: US 11,042,316 B1
(45) Date of Patent: *Jun. 22, 2021

(54) REORDERED DATA DEDUPLICATION IN STORAGE DEVICES

(71) Applicant: Seagate Technology LLC, Cupertino, CA (US)

(72) Inventors: Hongmei Xie, Milpitas, CA (US); AbdelHakim Alhussien, San Jose, CA (US); Sundararajan Sankaranarayanan, Freemont, CA (US); Alex Tang, Cupertino, CA (US); Leonid Baryudin, San Jose, CA (US); Erich Franz Haratsch, San Jose, CA (US)

(73) Assignee: seagate technology llc, Fremont, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/564,866

(22) Filed: Sep. 9, 2019

Related U.S. Application Data

(63) Continuation of application No. 15/493,102, filed on Apr. 20, 2017, now Pat. No. 10,409,518.

(51) Int. Cl.
 *G06F 3/06* (2006.01)

(52) U.S. Cl.
 CPC .......... *G06F 3/0641* (2013.01); *G06F 3/0608* (2013.01); *G06F 3/0688* (2013.01)

(58) Field of Classification Search
 CPC ..... G06F 3/0608; G06F 3/0641; G06F 3/0688
 See application file for complete search history.

(56) References Cited

U.S. PATENT DOCUMENTS

| 5,603,001 A * | 2/1997 | Sukegawa ............. G06F 3/0601 711/103 |
|---|---|---|
| 7,567,188 B1 | 7/2009 | Anglin et al. |
| 8,131,924 B1 | 3/2012 | Frandzel et al. |
| 8,788,788 B2 | 7/2014 | Colgrove et al. |

(Continued)

OTHER PUBLICATIONS

"Leveraging value locality in optimizing NAND flash-based SSDs", Department of Computer Science and Engineering, The Pennsylvania State University, PA, 2011, 13 Pages.

(Continued)

*Primary Examiner* — Larry T Mackall
(74) *Attorney, Agent, or Firm* — Kirk A. Cesari

(57) ABSTRACT

A device may include a SSD having multiple storage units and a deduplication control circuit configured to determine whether selected data content to be stored is a duplicate of previous data content already in a first buffer of data buffered to be stored in a set of storage units. The deduplication circuit may be further configured to, based on a determination that the selected data content is a duplicate of first previous data content already buffered in the first buffer, instead of buffering another copy of the selected data content, buffer a first header including a first pointer that associates the first header with the first previous data content already buffered in the first buffer. The deduplication circuit may also be configured to reorder the first buffer such that individual data contents in the first buffer are grouped near headers associated with the individual data contents.

20 Claims, 12 Drawing Sheets

(56) References Cited

U.S. PATENT DOCUMENTS

| | | |
|---|---|---|
| 8,930,645 B2 | 1/2015 | Chen et al. |
| 2010/0058013 A1 | 3/2010 | Gelson et al. |
| 2010/0082672 A1 | 4/2010 | Kottomtharayil |
| 2010/0205163 A1 | 8/2010 | Eshghi |
| 2011/0225211 A1 | 9/2011 | Mukherjee |
| 2012/0072656 A1 | 3/2012 | Archak et al. |
| 2012/0131025 A1 | 5/2012 | Cheung et al. |
| 2014/0032861 A1 | 1/2014 | Islam |
| 2014/0281155 A1 | 9/2014 | Cohen |
| 2014/0310476 A1 | 10/2014 | Kruus et al. |
| 2017/0031945 A1 | 2/2017 | Sarab |

OTHER PUBLICATIONS

Earl T Cohen, "Why Variable-Size Matters: Beyond Page-Based Flash Translation Layers," Flash Memory Summit, Santa Clara, CA, 2012, 17 pages.

Wikepedia, "Data Deduplication", https://en.wikipedia.org/wiki/Data_deduplication, Apr. 20, 2017, 7 pages.

Wikepedia, "Single instance storage", https://en.wikipedia.org/wiki/Single-instance_storage, Apr. 20, 2017, 3 pages.

Tian et al., "Last-level Cache Deduplication", http://faculty.cse.tamu.edu/djimenez/pdfs/p53-tian.pdf, Apr. 20, 2017, 10 pages.

Liu et al, "PLC-Cache: Endurable SSD Cache for Deduplication-based Primary Storage", Renmin University of China, CN, Jun. 2014, 22 pages.

Lu, "Frequency Based Chunking for Data De-Duplication" https://pdfs.semanticscholar.org/9b6d/f30a4ad0cfc03ffa0602172801119076b800.pdf, University of Minnesota, Minnesota, Retrieved Apr. 20, 2017, 10 pages.

Luo, "Boafft: Distributed Deduplication for Big Data Storage in the Cloud", IEEE Transactions on Cloud Computing, vol. 61, No. 11, Jan. 2015, 13 pages.

Liu, "A Delayed Container Organization Approach to Improve Restore Speed for Deduplication Systems", IEEE Transactions on Parallel and Distributed Systems, vol. 27, No. 9, Sep. 2016, 15.

\* cited by examiner

REORDERED DATA DEDUPLICATION IN STORAGE DEVICES

CROSS-REFERENCE TO RELATED APPLICATIONS

The present application is a continuation of and claims priority to pending U.S. patent application, application Ser. No. 15/493,102, filed Apr. 20, 2017, entitled "REORDERED LOCAL DATA DEDUPLICATION IN STORAGE DEVICES", the contents of which is hereby incorporated by reference in its entirety.

SUMMARY

In certain embodiments, a device may include a solid state data storage device (SSD) having multiple storage units and a deduplication control circuit configured to determine whether selected data content to be stored is a duplicate of previous data content already in a first buffer of data buffered to be stored in a set of storage units of the SSD. The deduplication control circuit may be further configured to, based at least in part on a determination that the selected data content is a duplicate of first previous data content already buffered in the first buffer, instead of buffering another copy of the selected data content, buffer a first header including a first pointer that associates the first header with the first previous data content already buffered in the first buffer. The deduplication control circuit may also be configured to reorder the first buffer such that individual data contents in the first buffer are grouped near headers associated with the individual data contents.

In certain embodiments, a device may include a solid state data storage device (SSD) having multiple storage units. The SSD may include a deduplication control circuit and a first buffer configured to buffer data to be stored in a set of local deduplication storage units of the SSD including one or more data contents and one or more headers associated with individual data contents of the one or more data contents, individual headers of the one or more headers associating a logical address with a respective data content. The deduplication control circuit may be configured to count a number of occurrences of headers in the first buffer associated with a first data content of the one or more data contents buffered in the first buffer and, when the number of occurrences is greater than a threshold, buffer the first data content in a second buffer of data buffered to be stored in a global deduplication storage space of the SSD and add a hash value of the second data content to a global hash lookup table.

In certain embodiments, a device may include a solid state data storage device (SSD) having multiple storage units. The SSD may include a deduplication control circuit configured to determine whether selected data content to be stored is a duplicate of previous data content already in a first buffer of data buffered to be stored in a set of storage units of the SSD. The deduplication control circuit may be further configured to, based at least in part on a determination that the selected data content is a duplicate of first previous data content already buffered in the first buffer, instead of buffering another copy of the selected data content, buffer a first header including a first pointer that associates the first header with the first previous data content already buffered in the first buffer. The deduplication control circuit may also be configured to reorder the first buffer such that individual data contents in the first buffer are grouped near headers associated with the individual data contents.

DETAILED DESCRIPTION

Figure 1:
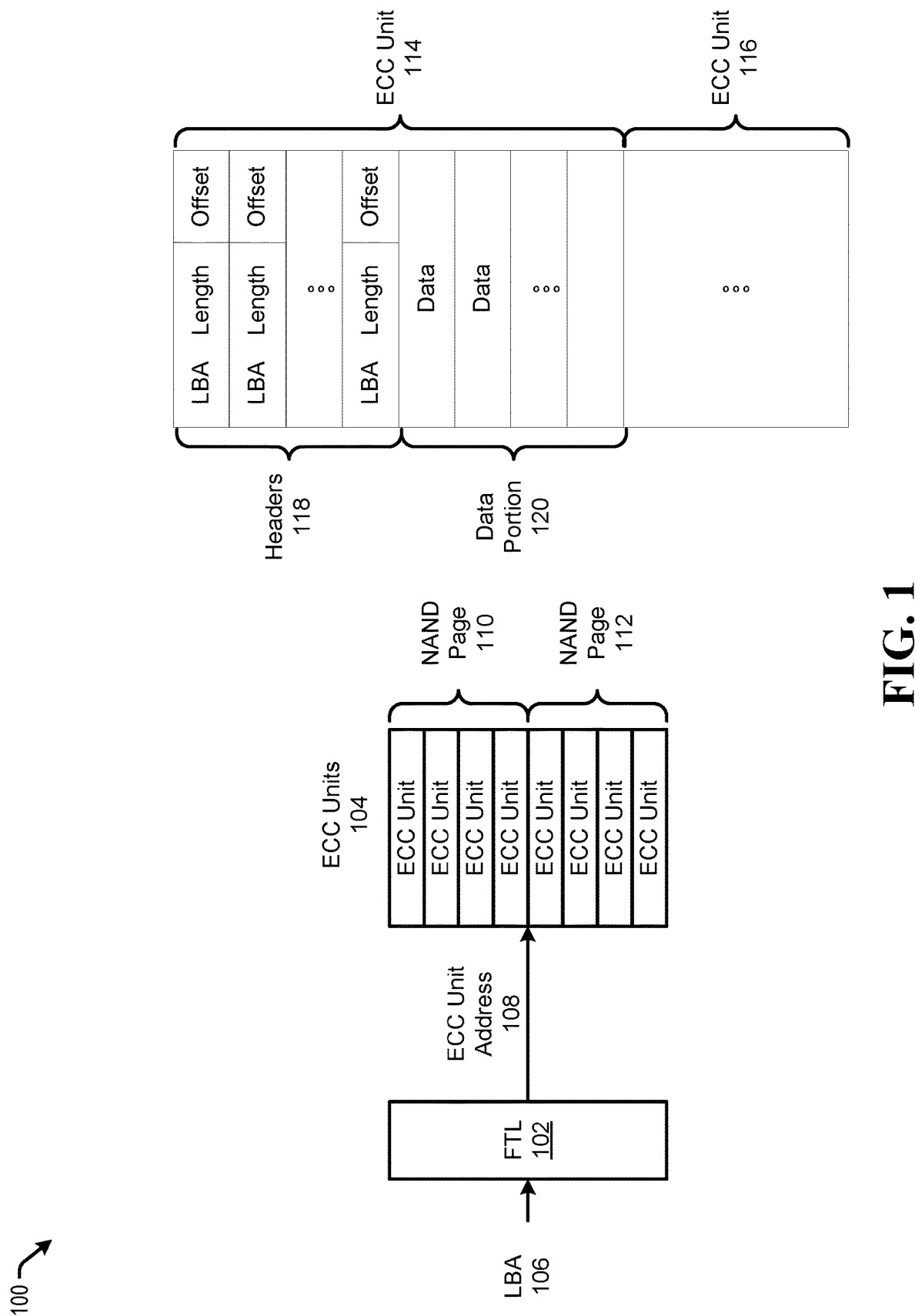
FIG. 1 is a block diagram that illustrates an example addressing and storage scheme of a storage device, in accordance with certain embodiments of the present disclosure.

In the following detailed description of the embodiments, reference is made to the accompanying drawings which form a part hereof, and in which are shown by way of illustrations. It is to be understood that features of the various described embodiments may be combined, other embodiments may be utilized, and structural changes may be made without departing from the scope of the present disclosure. It is also to be understood that features of the various embodiments and examples herein can be combined, exchanged, or removed without departing from the scope of the present disclosure.

In accordance with various embodiments, the methods and functions described herein may be implemented as one or more software programs running on a computer processor or controller. In accordance with another embodiment, the methods and functions described herein may be implemented as one or more software programs running on a computing device, such as a personal computer that is using a disc drive. Dedicated hardware implementations including, but not limited to, application specific integrated circuits, programmable logic arrays, and other hardware devices can likewise be constructed to implement the methods and functions described herein. Further, the methods described herein may be implemented as a computer readable storage medium or device including instructions that when executed cause a processor to perform the methods.

Saving space may be an important consideration in flash storage devices such as solid state drives (SSDs), which may suffer from write amplification (WA) due to asymmetric write, erase granularities and which may need to perform garbage collection. Write amplification may be greater than one (1), which may indicated more data than requested by a host may have to be written into flash. In addition, SSDs may need over-provisioning (OP), which may be some reserved storage space in the flash, and which may facilitate garbage collection. Hence, reducing the amount of data written into the flash may result in a reduction of write amplification, increased OP effectiveness, and improved read/write performance of the storage device.

In some storage systems according to this disclosure, controllers may attempt to reduce the amount of data written into the flash by removing redundancy from the original data, for example, using data deduplication. A goal of data deduplication may be to only keep unique data pieces in a storage device by not storing additional copies of already stored data pieces. Some examples according to this disclosure may include data deduplication techniques for SSDs that may work on a local or less than global range and data deduplication techniques for SSDs that may work on a local and a selectively global range. Some such examples may avoid use of a specialized extra mapping table in a Flash Translation Layer (FTL), include minor or no changes in a flash storage format and FTL, include minor or no changes to garbage collection policies, and which include no permanent maintenance of a duplication-check data structure such as a hash lookup table.

Data deduplication may attempt to avoid storage of multiple identical copies of data pieces such as identical files, and may instead store one unique copy that may be shared. Data pieces may be deemed identical if, for example, the data pieces bear a same "signature" (e.g. a same cyclic redundancy check (CRC) or a same hash value). A signature may be generated by sending the data piece into a signature function. Signatures may be long enough to ensure almost one-to-one correspondence with the data pieces. In other words, if signatures generated for two files are the same, then the two files should be identical (e.g. with a probability approaching to 1).

Signatures may be stored in a lookup table (e.g. a hash lookup table) and may be calculated following a data stream. If the current data piece produces a signature that already exists in the lookup table, a duplication may said to be found. Then, an association or pointer may be created between the data piece and the address of the unique data piece stored previously, instead of storing the same data piece again (e.g. in the drive).

It should be noted that data deduplication may be performed for different units of data pieces. For example, SSDs may include associating a logical block address (LBA) of a logical page (LP) to a physical block address (PBA) in the storage drive. In some example embodiments, signatures may be calculated for each LP (4 KB data chunk or pieces, for example). In some other example embodiments, signatures may be calculated for a data piece of 4 KB composed of 8 LPs (e.g. each LP may be 512 Bytes). As such, in such an embodiment, data deduplication may be carried out on a LP level or multi-LP level. In some examples, this may be accomplished by having multiple LBAs point to the same PBA in the flash translation layer (FTL) mapping table.

FIG. 1 is a block diagram that illustrates an example addressing and storage scheme 100 of a storage device according to some embodiments herein. As shown, the scheme 100 of the storage device may include a flash translation layer (FTL) table 102 and a plurality of addressable ECC units 104. In addition, scheme 100 shows an example of addressing and storing or retrieval of data based on an LBA from a host.

The addressing and storing of an example controller shown in FIG. 1 may use a basic storage unit of one error correction code (ECC) unit. As such, the location of the ECC unit may equate to the PBA and may be mapped from the LBA in the FTL 102. In some examples, the ECC units 112 may be grouped into pages such as NAND flash pages 110 and 112.

As shown, in operation, an LBA 106 may be received by the FTL 102. The FTL 102 may perform translation on the LBA 106 into a physical block address (PBA) which, in the illustrated example, may take the form of an ECC unit address 108. Once the ECC unit matching the PBA (e.g. ECC unit 114 or 116) is found in the ECC units 104, the headers 118 may be searched for the header containing the received LBA 106. Next, the data piece pointed to by the header may be found from among the data portion 120 using the length and offset values in the header.

In some examples, an ECC unit may be 2 KB in size. When data pieces (or chunks) are small or when data compression is employed, an ECC unit may accommodate multiple data pieces. In this case, multiple LBAs may be mapped to the same PBA (e.g., ECC unit address). To retrieve data for a LBA within an ECC unit, the data body (or data content) associated with the LBA may be associated with a header. Each LBA may have its own header which may contain its LBA value, a length, and an offset field. The length and offset values point to the location of the associated data content within one of the ECC units. Though not shown, in some examples, a data body may extend between ECC units.

In the illustrated example, the ECC unit storage format may allow the data parts to be identified without ambiguity given an LBA value (e.g., a header). Such an ECC unit storage format may be referred to as a "locally addressable data storage", and may utilize ECC units as a basic storage unit. The ECC unit based locally addressable data storage shown in FIG. 1 is merely an example, and the disclosed subject matter may apply to other unit sizes and formats of local reference between data and header as well.

Figure 2:
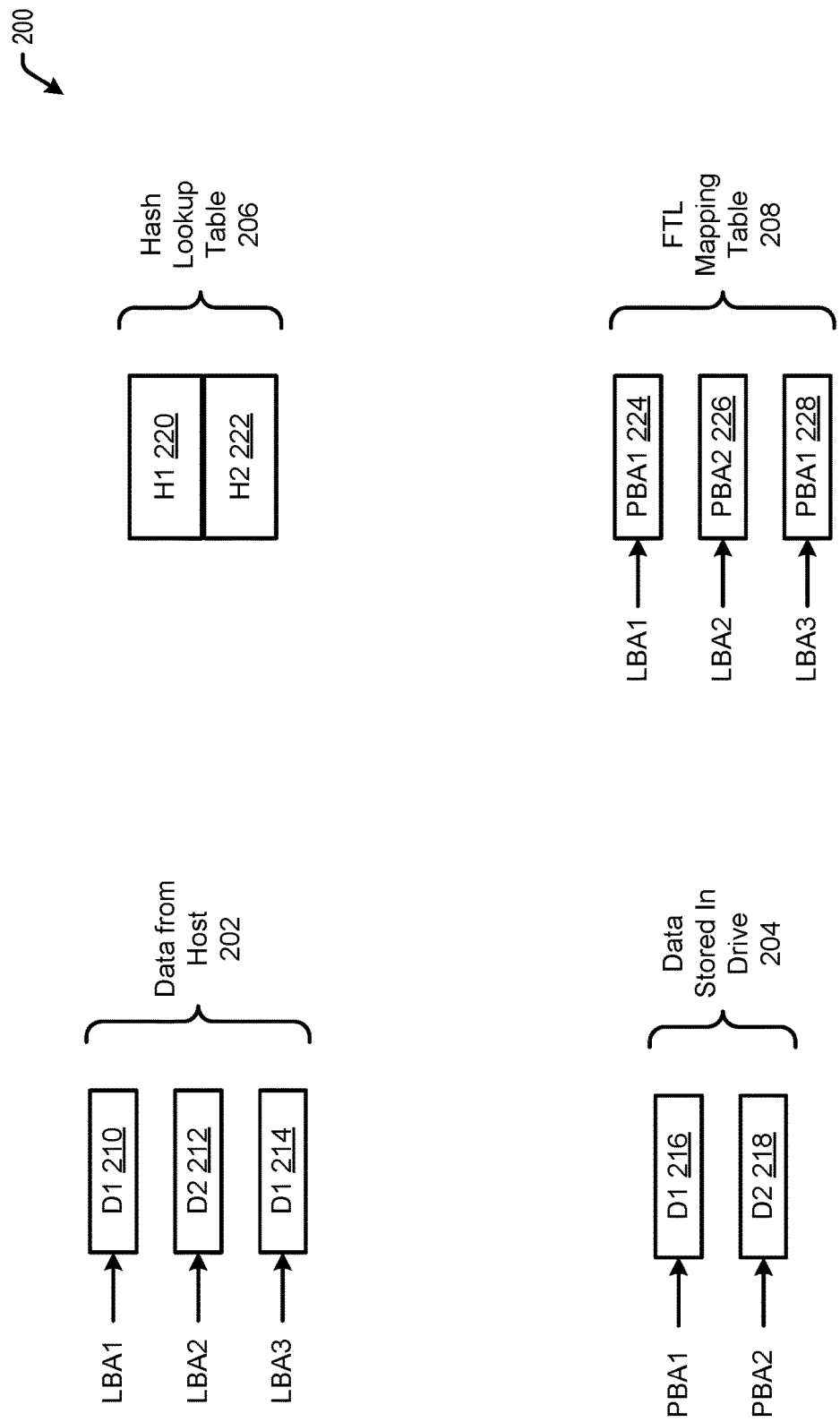
FIG. 2 is a block diagram that illustrates various portions of a storage scheme with data deduplication, in accordance with certain embodiments of the present disclosure.

FIG. 2 is a block diagram that illustrates various portions of a storage scheme 200 with data deduplication according to some embodiments herein. These portions include data received from a host 202, data stored in the drive 204, a hash lookup table 206, and a FTL mapping table 208.

The data from the host 202 may include three data pieces 210-214 from the host with logical block addresses LBA1, LBA2 and LBA3 and data contents D1, D2, and D1, respectively (e.g., the content of LBA3 is a duplication of LBA1).

As data pieces 210 and 212 are received from the host, the storage drive may generate hash values for the data pieces (e.g. H1 may be generated for D1 of 210 and H2 may be generated for D2 of 212). As H1 220 and H2 222 are not present in the hash lookup table 206, H1 220 and H2 222 may be stored to the hash lookup table 206 and D1 of 210 may be stored to the physical block address PBA1 216 and D2 of 212 may be stored to PBA2 218. Further, entries 224 and 226 in the FTL mapping table 208 for LBA1 and LBA2 may be stored for the data pieces 210 and 212 (e.g. data contents D1 and D2). For example, entries for LBA1 and LBA2 in the FTL mapping table may have pointers to PBA1 and PBA2, respectively.

When the request to write the data piece 214 including data contents D1 to LBA3 is received, the signature H1 may be generated which is the same as the signature for data piece 210. The hash lookup table 206 may be searched and the signature H1 220 may be found in the hash lookup table entry 220. As such, the data piece 214 may not be written into the storage drive. Instead, the FTL mapping table entry 228 for LBA 3 may be set to PBA 1, the same as the entry for LBA1 224. Further, a header including the length and offset for the data content D1 at 218 may be stored. In this manner, duplication of data may be reduced.

In some implementations, reading data from the storage drive may be the same or similar to the write procedure discussed above with the exception that it may only need information from the FTL mapping table 208. For example, to retrieve the data associated with LBA3, PBA1 may be visited based on information from the FTL mapping table entry 128. The headers stored at PBA1 may be searched for the header associated with LBA3. Then, using the length and offset of the header associated with LBA3, the requested data may be retrieved.

Generally, garbage collection (GC) for a PBA may be performed by determining the LBAs mapped to that PBA. If there is no LBA pointing to the PBA, the PBA may be erased. Otherwise, the PBA may need to be recycled and the mapping table entries of the LBAs associated with the PBA may be updated.

Some implementations according to this disclosure may utilize a data deduplication technique that may keep one mapping table from LBA to PBA in the FTL, and which may include no or minor modifications to the mapping format. Data update and garbage collection policies may also stay intact, and the hash lookup table may not be maintained after data is written into the storage device. In some embodiments, the range that may be checked for duplications may be defined as some local level (e.g. as opposed to a global level).

Figure 3:
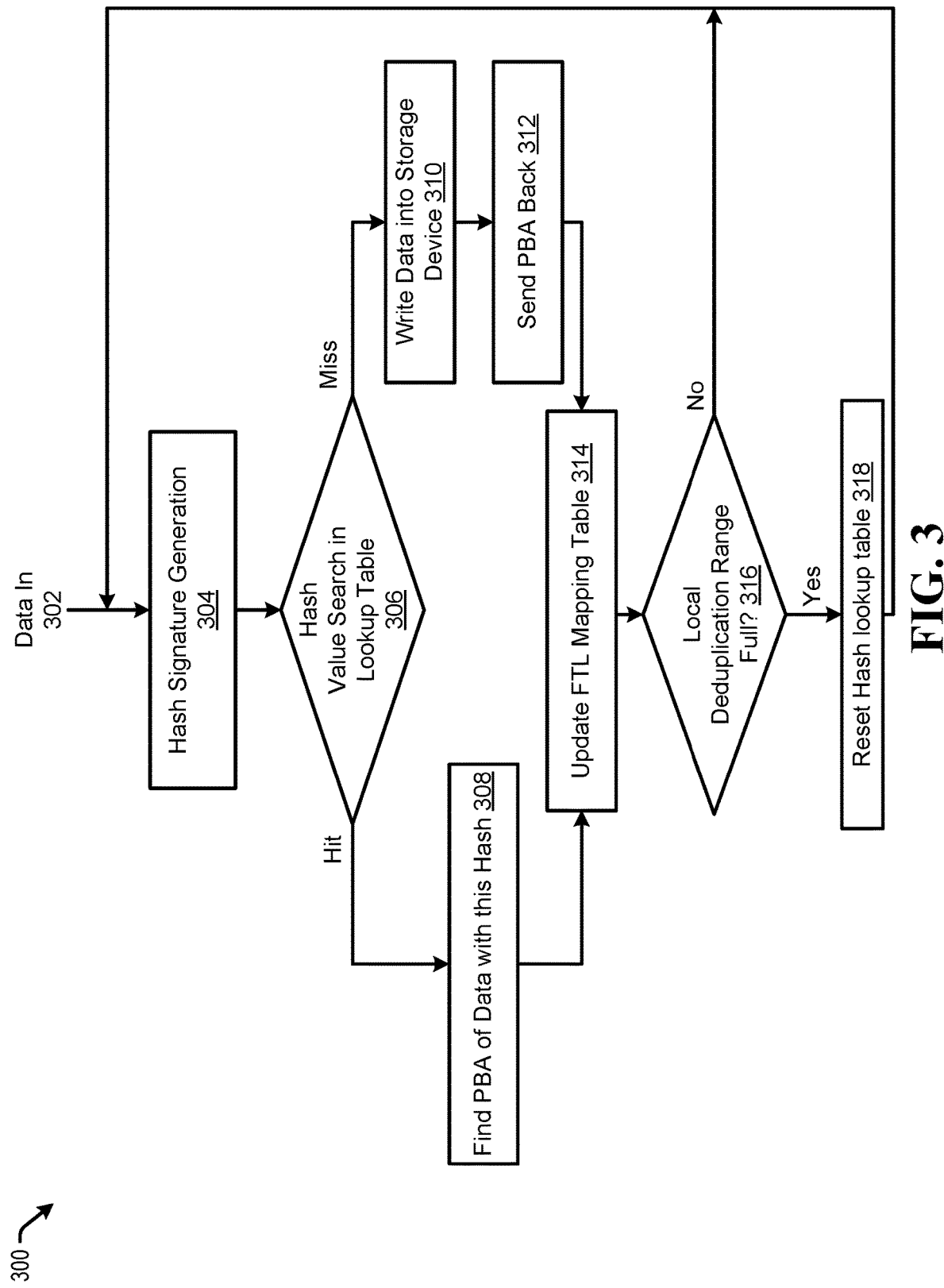
FIG. 3 is a flowchart of a method for handling a write request with data deduplication, in accordance with certain embodiments of the present disclosure.

Referring to FIG. 3, a flowchart of a method for handling a write request with data deduplication according to some embodiments herein is shown and is generally designated 300. The method 300 can be an embodiment of the systems and techniques discussed above regarding 100 and 200. The operations of method 300 may be performed as detailed above with respect to FIGS. 1 and 2.

In operation, data 302 may be received as part of a write request. At 304, the incoming data piece may be fed into a hash function and a hash value (e.g. signature) may be generated.

At 306, the hash lookup table may be checked to see if the current hash value already exists. If the current hash value already exists in the hash lookup table (e.g., a hit, the process may continue to 308. If the current hash value does not exist in the table (e.g., a miss), the process may continue to 310.

At 308, the PBA that corresponds to the matched hash value may be determined and the returned for use in updating the FTL mapping table. On the other hand, at 310, the data piece may be written to the storage device. At 312, the PBA of the location that stores this data piece may be sent back to update the FTL mapping table.

Following 308 or 312, at 314, the PBA that stores the data piece may be used to update the FTL mapping table. The process may then go to 316 and check if current local deduplication range is full. If so, the hash lookup table may be reset to empty state at 318 and then the flow return to 304. Otherwise, the process may then return to 304 directly. The range of deduplication here may refer to a size of some storage space in a storage device, which may vary and may be smaller than the entire capacity of the device, referred to as a "local" deduplication range in general.

FIGS. 4-12 illustrate additional examples of systems which may include data deduplication.

Figure 4:
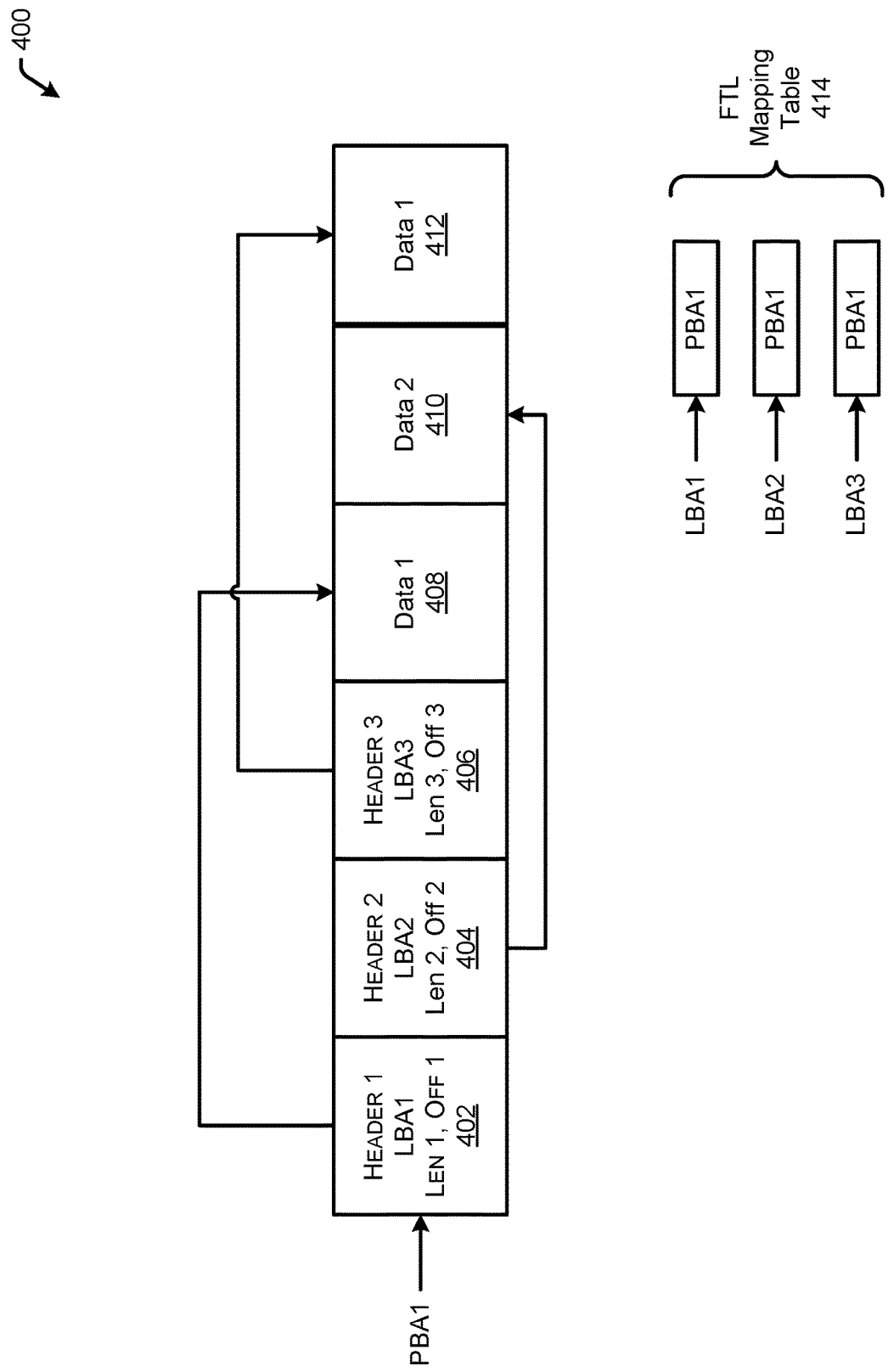
FIG. 4 is a block diagram that illustrates an example of data storage in an error-correcting code memory (ECC) unit without data deduplication, in accordance with certain embodiments of the present disclosure.

FIG. 4 is a block diagram that illustrates an example 400 of data storage in an ECC unit without data deduplication according to some embodiments herein. Continuing the example discussed above with respect to FIG. 2, FIG. 4 includes three data pieces that are associated with LBA1, LBA2, and LBA3 and with content data 1, data 2, and data 1, respectively. More particularly, header information for LBA1, LBA2, and LBA3 may be stored at locations 402-406 of the ECC unit associated with PBA1, respectively. In addition, the data contents data 1, data 2, and data 1 may be stored at locations 408-412 of the ECC unit associated with PBA1, respectively. Each header 402-406 may include length and offset information that points to the respective location 408-412 storing the associated data. Further, the example 400 may include a flash translation layer table 414 that may include mappings between each of LBA1, LBA2, and LBA3 and PBA1.

As such, in the illustrated example without data deduplication, since each header may have its own data body, the same data 1 may be stored twice (at 408 and at 410), pointed to by header 1 at 402 and header 3 at 406, respectively.

Figure 5:
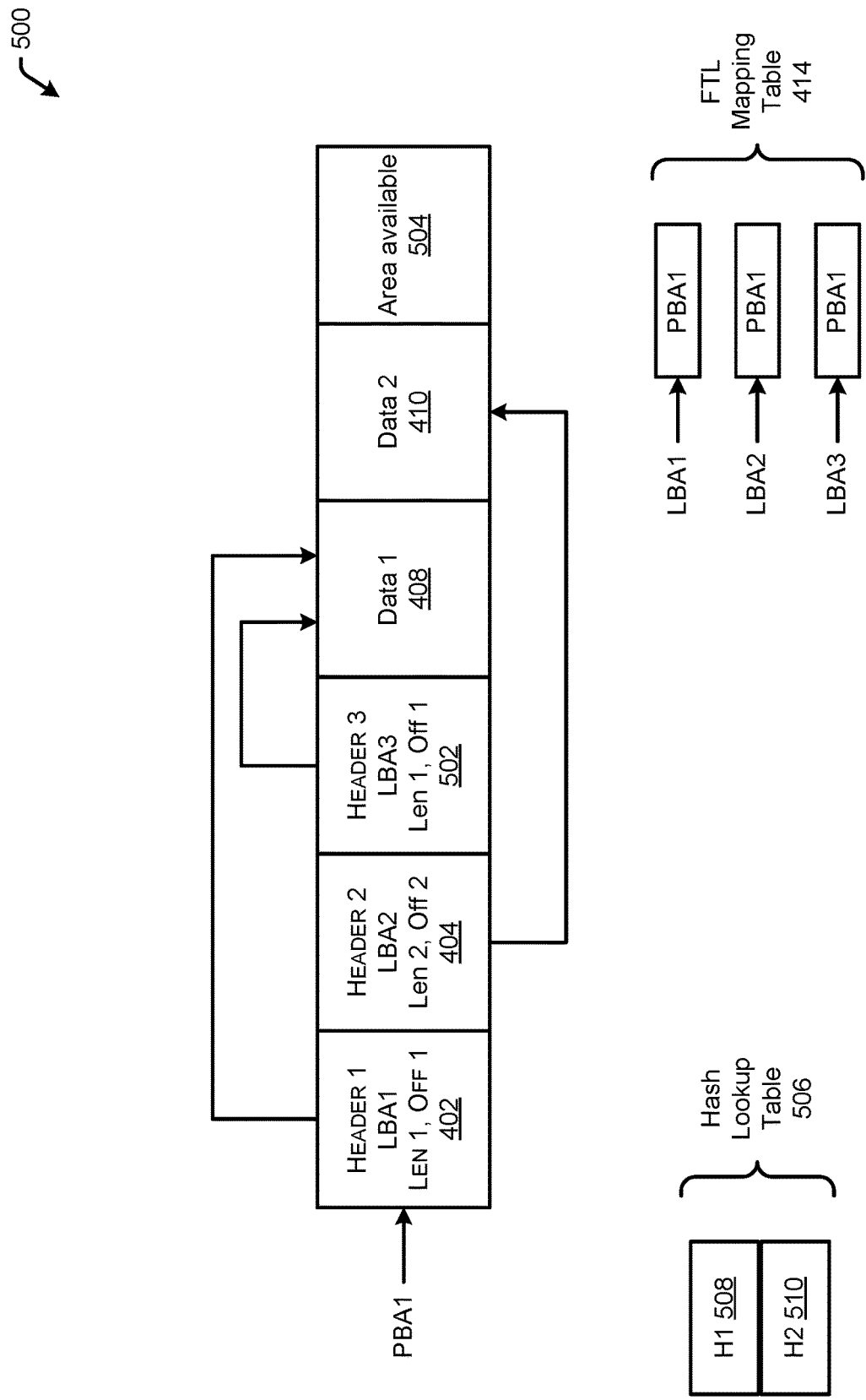
FIG. 5 is a block diagram that illustrates an example of data storage in an ECC unit with data deduplication, in accordance with certain embodiments of the present disclosure.

FIG. 5 is a block diagram that illustrates an example 500 of data storage in an ECC unit with data deduplication according to some embodiments herein. More particularly, example 500 includes a storage situation equivalent to that shown in FIG. 4, modified to include data deduplication. As illustrated, the local data deduplication (LDD) shown in FIG. 5 may enable multiple headers (e.g. LBAs) to point to the same data body (e.g. the same offset and range within an ECC unit).

In comparison to FIG. 4, the length and offset fields of header 3 at 502 in the ECC unit may point to data 1 408, the data body pointed to by LBA1. As such, using local data deduplication such as that shown in FIG. 5, duplicate data pieces may not be stored within an ECC unit (e.g. thereby making area 504 available to store other data). This form of data deduplication may be referred to herein as local data deduplication.

Herein, header 3 for LBA3 at 502 may be referred to as a duplicate header. Duplicate headers, such as header 3 for LBA3, may have the same fields as normal headers but may point to a previously stored data body instead of a corresponding copy. Depending on how the offsets are defined, the two offset values in header 1 and duplicate header 3 may differ, but point to the same location in PBA1.

In comparison to FIG. 4, the operation of the FTL mapping table 414 may not change due to the inclusion of data deduplication. However, the data deduplication scheme of FIG. 5 may include a hash lookup table 506. This hash lookup table 506 may be used in the manner discussed above with regard to FIGS. 2 and 3.

In addition, the read and write operations in a local data deduplication scheme such as that shown in FIG. 5 may be as discussed above with regard to FIGS. 2 and 3. That is, a write operation may include hash calculation, hash value lookup, a write to the storage device if the calculated hash is not present (e.g., the data to be written is unique data), and FTL mapping table update. Read operations may operate in a similar manner with the exception that hash calculation and hash lookup may not be performed. That is, the read operation may include finding the PBA value for the target LBA by looking up the LBA in the FTL, searching in the PBA location (e.g. a ECC unit) for the header containing the searched LBA, and finding the data via the length and offset values of the header.

Figure 6:
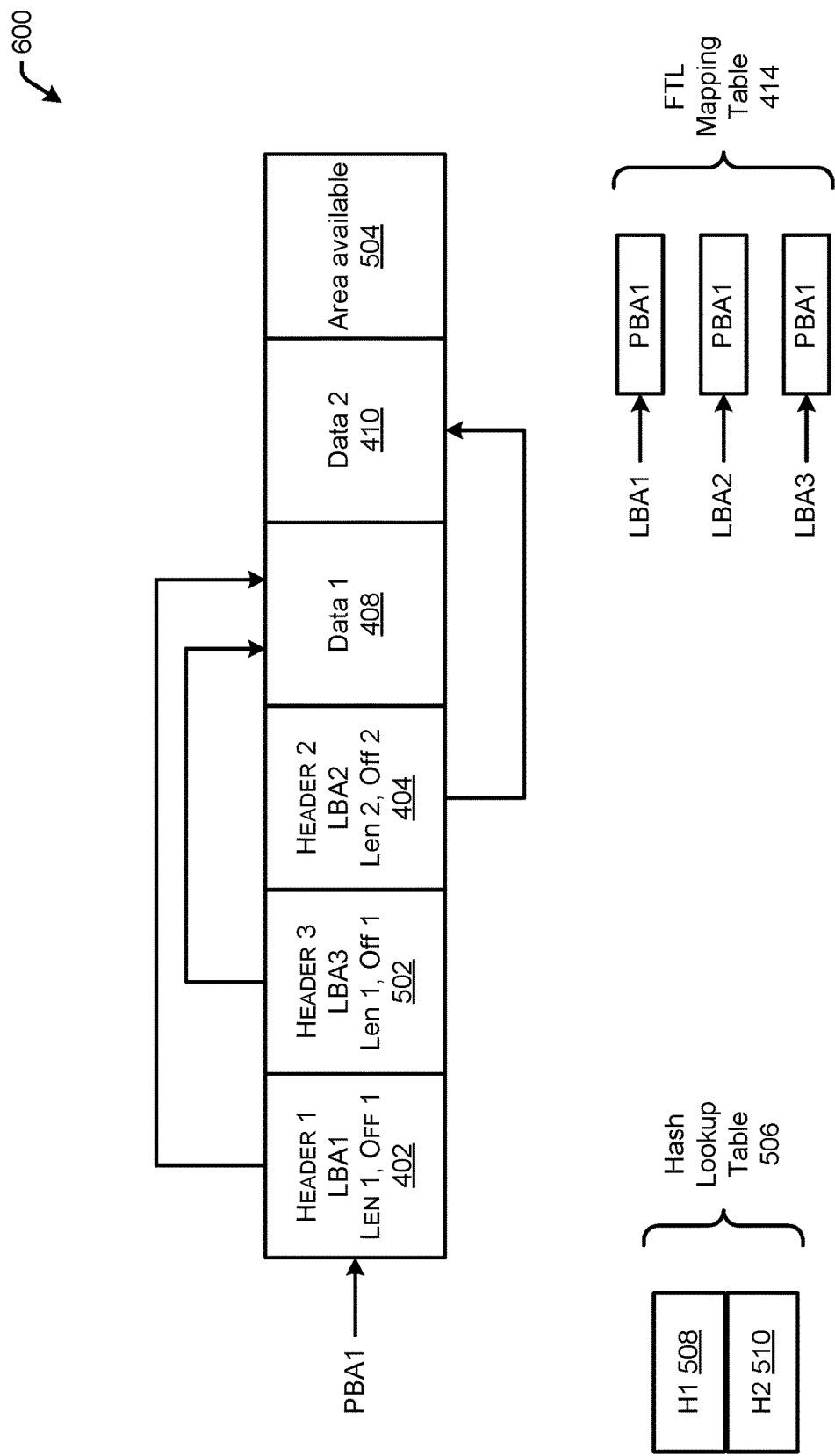
FIG. 6 is a block diagram that illustrates an example 600 of data storage in an ECC unit with reordered local data deduplication (RLDD), in accordance with certain embodiments of the present disclosure.

FIG. 6 is a block diagram that illustrates an example 600 of data storage in an ECC unit with reordered local data deduplication (RLDD) according to some embodiments herein. More particularly, the example 600 illustrates the ECC unit at PBA 1 of FIG. 5 where the storage of the data associated with LBA1-LBA3 is performed using RLDD.

In general, RLDD may involve buffering data for storage operations of plurality of LBAs and data pieces. In some examples, the buffering may be performed for a sufficient number of LBAs and respective data pieces to, for example, fill multiple storage units (e.g. ECC units).

Initially, RLDD processing may be similar to LDD with a hash lookup being performed for incoming data as discussed above. However, instead of storing the header and data piece or duplicate header immediately, the header and data piece or duplicate header may be buffered. The buffering may continue until, for example, the buffer is full or a maximum number of data pieces have been processed. Once the buffer is full, the buffered data may be reordered and written to storage. In some examples, the LBAs may be reordered or grouped according to the duplication information obtained till this point such that LBAs sharing a particular data body (e.g. associated with the same data content) may be grouped together. Then, the LBAs in each duplication group may be written into the same storage location (e.g. ECC unit), where a single copy of the data piece may be stored and pointed to by all the headers corresponding to the shared data (e.g. the data piece may be shared by multiple headers).

As shown in FIG. 6, the reordering may be reflected by the reversal in the order of headers 2 404 and 3 502. This may be due to the grouping of header 1 402 and header 3 502 in the buffer due to the data pieces associated with the headers having the same hash value.

Figure 7:
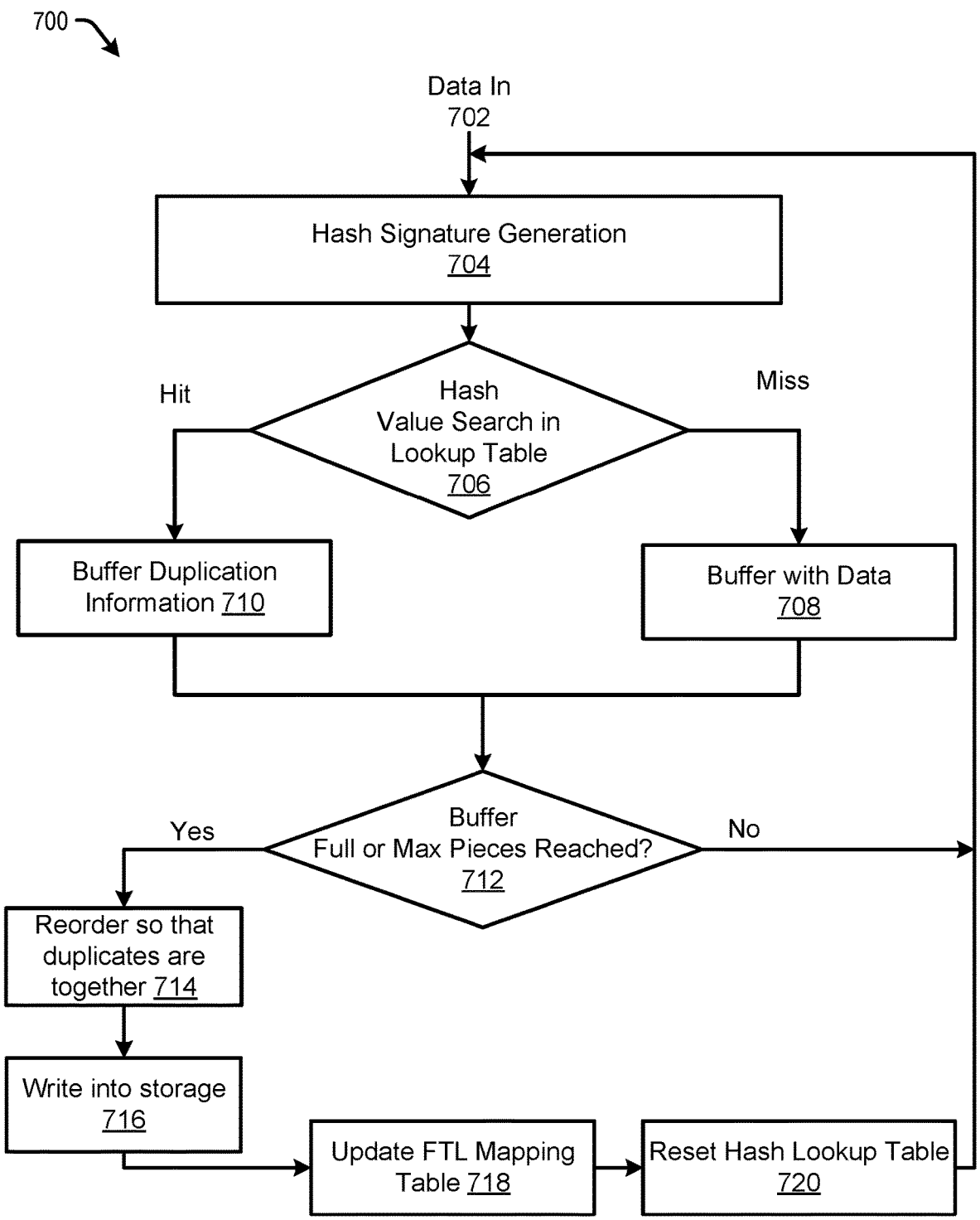
FIG. 7 illustrates a flowchart of a method for handling a write request with reordered local data deduplication, in accordance with certain embodiments of the present disclosure.

Referring to FIG. 7, a flowchart of a method for handling a write request with reordered local data deduplication according to some embodiments herein is shown and is generally designated 700. The method 700 can be an embodiment of the systems and techniques discussed above regarding 600. The operations of method 700 may be performed as detailed above with respect to FIGS. 1-7.

In operation, data 702 may be received as part of a write request. At 704, the incoming data piece may be fed into a hash function and a hash value (e.g. signature) may be generated. At 706, a hash lookup table may be checked to see if the current hash value already exists. If the current hash does not exist in the table (e.g., a miss), the process may continue to 708. If the current hash value already exists in the hash lookup table (e.g., a hit), the process may continue to 710.

At 708, the process may respond to a hash lookup table miss by buffering a header along with the current data content for storage. In other words, because the hash lookup table search resulted in a miss, the process may determine that the current data content has not been buffered previously. As such, a header along with the current data content may be buffered and the hash value of the current data piece may be added to the hash lookup table.

At 710, the process may respond to a hash lookup table hit by buffering a duplicate header for the current data content for storage. In other words, because the hash lookup table search resulted in a hit, the process may determine that the current data content has been buffered previously. As such, a duplicate header may be buffered with duplicate information to associate the duplicate header with the previously buffered data piece.

Following 708 or 710, the process may determine whether the buffer is full or a maximum number of data pieces have been reached at 712. If so, the process may continue to 714. Otherwise, the process may return to 704 and process another data piece.

At 714, the buffered information may be reordered so that duplicates may be grouped together. For example, for a group of duplicates, the header and data piece may be ordered to be first of a group, followed by the duplicate headers that are associated with the data piece. Next, at 716, the reordered buffer data and headers may be written to the storage device. To the extent possible, the writing may be performed to place an entire group in the same storage unit (e.g. ECC unit). In some cases, an entire group may not fit into a storage unit or the remaining space in a current storage unit. In some examples, the process may subdivide the group (e.g. where the group will not fit into a full storage unit) or write the next group in the buffer to a current storage unit and store the current group in a next storage unit (e.g. where the current group will fit in an entire storage unit but the current storage unit has insufficient remaining space).

At 718, the FTL mapping table may be updated based on the written data. Following the update of the FTL mapping table, at 720, the hash lookup table may be reset for use with a next set of buffered data pieces. Following 720, the process may return to 704 and process another data piece.

Figure 8:
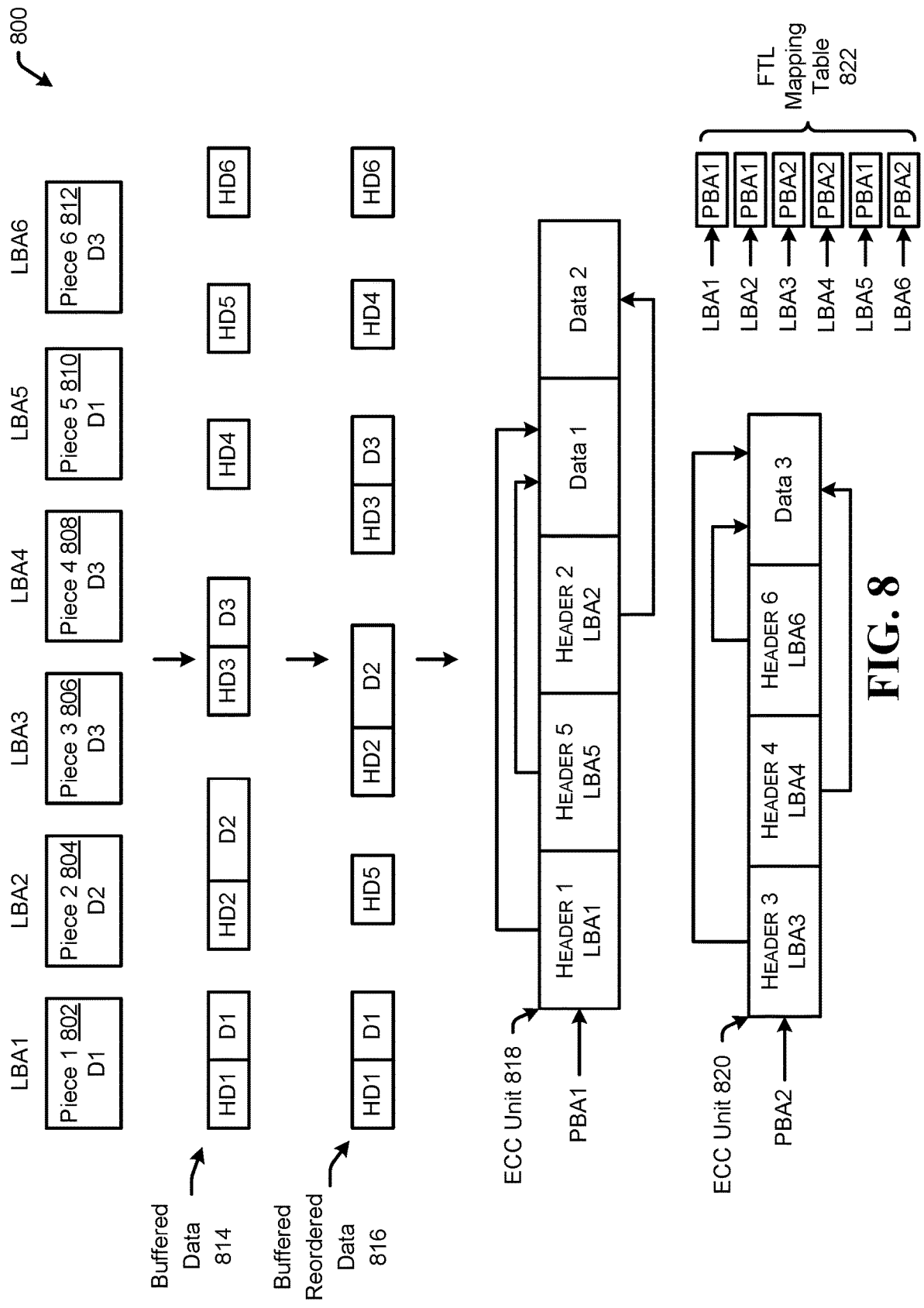
FIG. 8 is a block diagram that illustrates an example 800 of data storage in a storage device with reordered local data deduplication (RLDD), in accordance with certain embodiments of the present disclosure.

FIG. 8 is a block diagram that illustrates an example 800 of data storage in a storage device with reordered local data deduplication (RLDD) according to some embodiments herein. More particularly, the example 800 illustrates an RLDD scheme over multiple storage units (e.g. ECC units) through the various stages of the process discussed in FIG. 7.

As shown in FIG. 8, six data pieces 802-812 corresponding to LBA1-LBA6, respectively, are received from a host for writing. Pieces 1 802 and 5 810 are associated with the same data content D1, piece 2 804 is associated with data content D2, and pieces 3 806, 4 808 and 6 812 are associated with the same data content D3.

The system may generate buffer data 814 for the data pieces 802-812. As discussed above with regard to FIG. 7, the buffering process may determine for each data piece whether the data content is already buffered, for example, using a hash lookup table search. When the data content has not been buffered (such as for data pieces 802-806), a header and data content may be buffered for storage and a hash of the data content may be added to the hash lookup table. On the other hand, when the data content has already been buffered, duplicate header information may be buffered for the data piece. For example, the duplicate header information may associate the header with the already buffered data content. In some examples, data compression may be used. In such examples, the data content may be compressed before buffering. This may allow for more data pieces to be processed prior to the reordering and storing of the buffered data.

Once the buffer is full or some maximum number of data pieces has been processed, the system may reorder the data into buffered reordered data 816. As shown, the buffered data has been grouped such that the information associated with data content D1 (e.g. header 1 and data content 1, (HD1 and D1) and header 5 (HD5)) is grouped, the information associated with data content D2 is grouped, and the information associated with data content D3 is grouped.

Next, the buffered reordered data may be written to the storage device (e.g. ECC units 818 and 820). In addition, the FTL mapping table 822 may be updated as the data is written from the buffer to the storage device.

Read operations in some examples of data storage in RLDD may be performed in the same or similar manner as discussed above for LDD (e.g. using the FTL mapping table). For example, in FIG. 8, the FTL mapping table 822 may inform the system that LBA5 is mapped to PBA1 in response to a read request for LBA5. LBA5 may be searched within the ECC unit 818 based on the address PBA1. The search may retrieve the header HD5, whose length and offset fields may point to data 1, the data content of LBA5.

In some examples, the data update process for an LBA in RLDD may be similar to a write process. As such, the system may perform the RLDD write data flow to write the updated data of the updated LBA into a new ECC unit.

Figure 9:
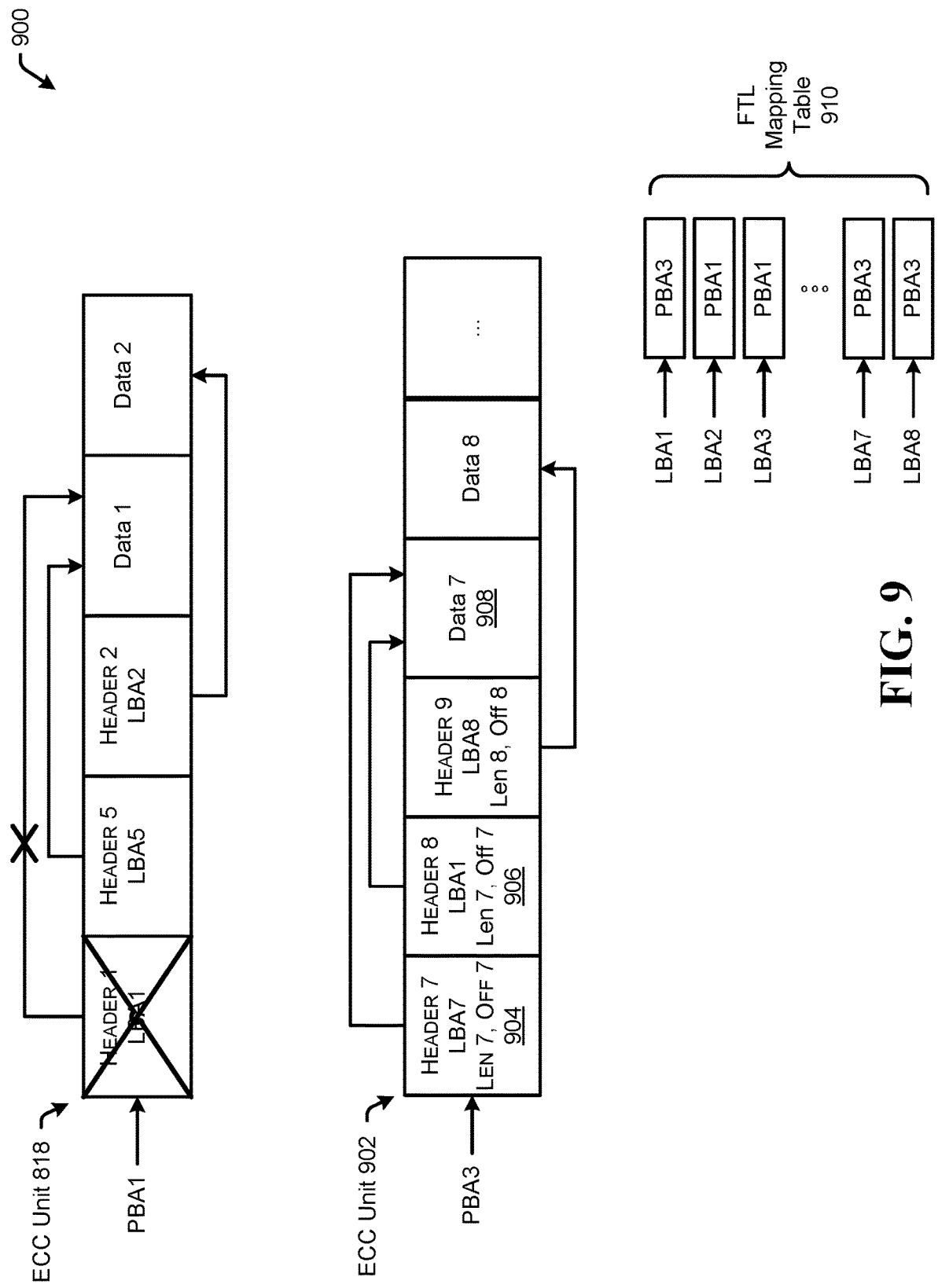
FIG. 9 is a block diagram that illustrates an example of an update operation in a storage device with reordered local data deduplication (RLDD), in accordance with certain embodiments of the present disclosure.

FIG. 9 is a block diagram that illustrates an example 900 of an update operation in a storage device with reordered local data deduplication (RLDD) according to some embodiments herein. More particularly, the example 900 illustrates an update in the RLDD scheme in which LBA1 of FIG. 8 is updated and new data is stored in a third ECC unit 902.

As mentioned above, in the illustrated example, the data content to be associated with LBA1 is updated to data 7 908 (or D7). In some examples, the writing of LBA1 may follow the write data flow. In FIG. 9, LBA1 may be grouped with LBA7, since the same data content is to be associated therewith. As such, when written to ECC unit 902, headers 7 904 and 8 906 (which may be the new header for LBA1) may be grouped and may share the same data content, data 7 908. In addition, FTL mapping table 910 may be updated. In changing the mapping table entry for LBA1 to point to PBA3, header 1 in ECC unit 818 may become invalid, as indicated by the crosses shown in FIG. 9.

Some storage devices, such as SSDs, may not erase the storage units (e.g. flash cells) immediately after an update. For example, the original data piece associated with LBA1, data 1, may continue to be stored in ECC unit 818 following the update of LBA1. As such, the other LBAs in the same duplication group as LBA1 prior to the update (e.g. LBA5) may continue to point to data 1 in ECC unit 818 and may continue to be mapped to PBA1 in the FTL. In this way, updating LBA1 may not induce data loss for LBA5.

Garbage collection in RLDD may be a process to erase data stored in the storage device. In some examples, stored data may be erased when no LBA is pointing to it. If an LBA is pointing to data stored in a storage unit (e.g. ECC unit) to be updated, the data may be recycled to a new location. As such, when an ECC unit is to be erased, the system may determine if a valid LBA points a header in the ECC unit. If so, the valid LBA and its data content may be buffered for storage in a new ECC unit. Garbage collection may be performed over various ranges, such as ECC unit or over larger ranges such as over a flash block (e.g. which may be the smallest unit that can be erased) or multiple blocks. In the case of a larger GC range, all headers in the range may be checked to see if the associated LBAs continue to point to the storage unit of the header and the system may determine whether or not to erase or recycle the data content based thereon.

Continuing the example of FIG. 9, when checking the validity of headers in PBA1, the system may find that header 1's LBA value LBA1 may no longer be mapped to PBA1 in the FTL mapping table and header 1 may therefore be invalid. However, the system may find that LBA5 continues to validly associate with header 5 and, by extension, data 1. As such, the system may determine that LBA 5 and data 1 should be recycled to a new storage location. If LBA5 and LBA2 had also been updated, the system may determine that all headers in the ECC unit 818 may be invalid and, as such, determine that ECC unit 818 may be erased.

Figure 10:
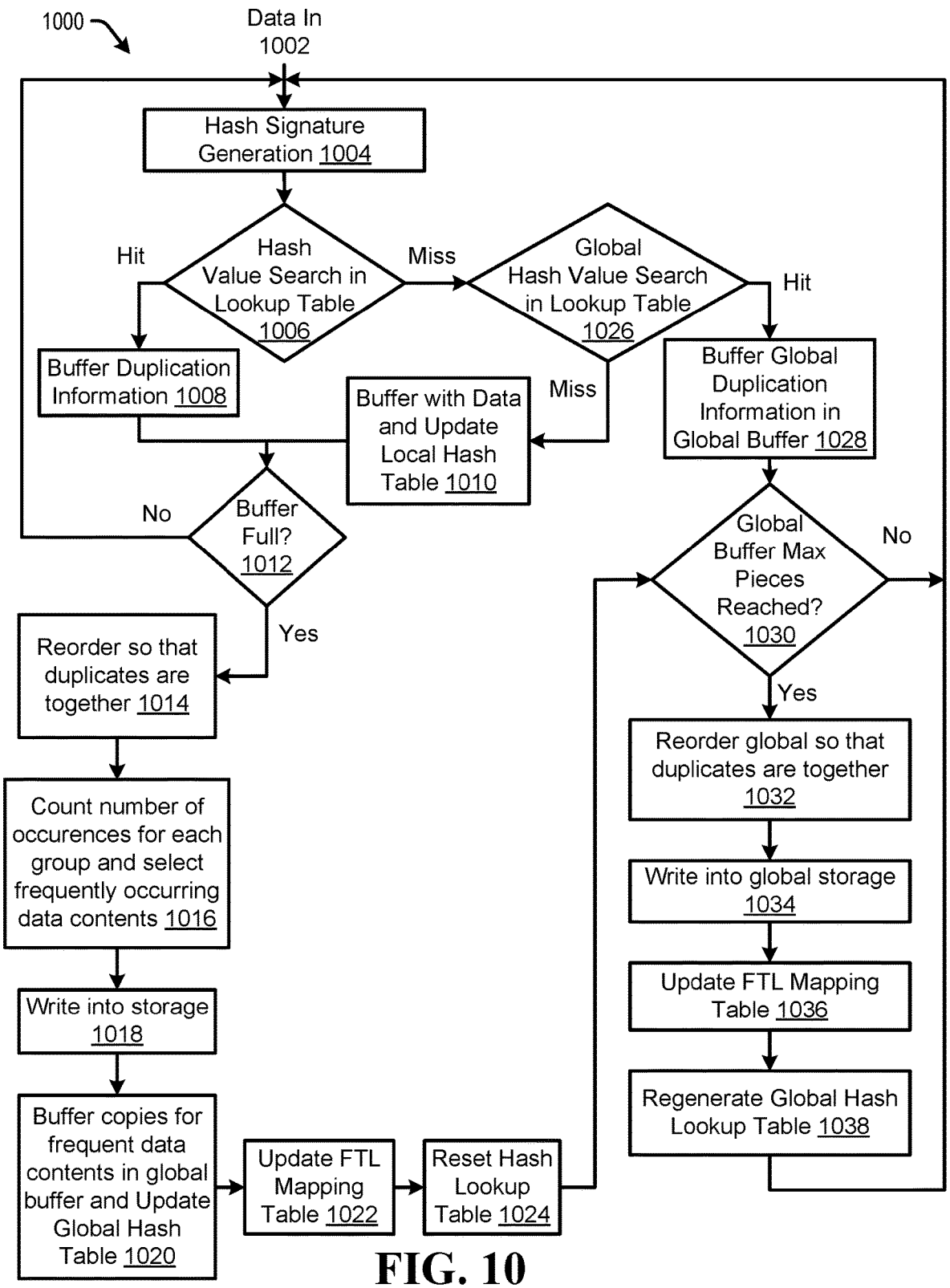
FIG. 10 is a flowchart of a method for handling a write request with reordered local data deduplication with selective global deduplication, in accordance with certain embodiments of the present disclosure.
Figure 11:
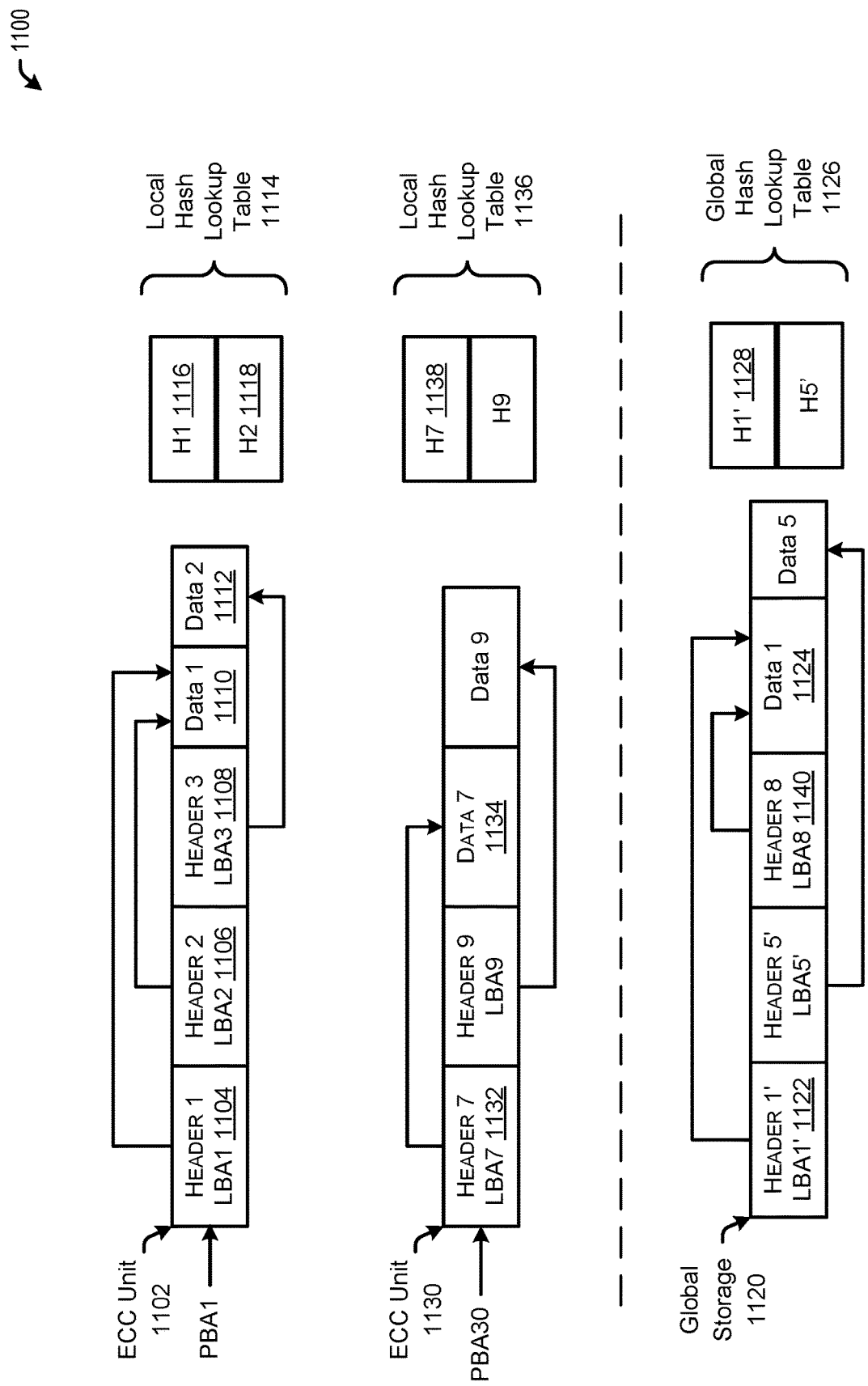
FIG. 11 is a block diagram that illustrates an example of data storage with reordered local data deduplication based selective global deduplication (RLDD-SGD), in accordance with certain embodiments of the present disclosure.

FIGS. 10-11 relate to another version of RLDD with selective global deduplication (RLDD-SGD) according to some embodiments herein. In some examples, RLDD-SGD may provide for global deduplication operations for data that may appear frequently. For example, data content that appears frequently may be copied to global deduplication storage space and used in global deduplication.

Referring to FIG. 10, a flowchart of a method for handling a write request with reordered local data deduplication with selective global deduplication according to some embodiments herein is shown and is generally designated 1000. The method 1000 can be an embodiment of the systems and techniques discussed herein.

In operation, data 1002 may be received as part of a write request. At 1004, the incoming data piece may be fed into a hash function and a hash value (e.g. signature) may be generated. At 1006, a local hash lookup table may be checked to see if the current hash value already exists. If the current hash value does not exist in the local hash lookup table (e.g., a miss), the process may continue to 1026. If the current hash value already exists in the local hash lookup table (e.g., a hit), the process may continue to 1008.

At 1008, the process may respond to a local hash lookup table hit by buffering a duplicate header for the current data. In other words, because the local hash lookup table search resulted in a hit, the current data has been buffered previously. As such, a duplicate header is buffered with duplicate information that may associate the duplicate header with the previously buffered data piece. The process may continue to 1012.

At 1026, a global hash lookup table may be checked to see if the current hash value already exists in the global hash lookup table. If the current hash value already exists in the global hash lookup table (e.g., a hit), the process may continue to 1028. If the current hash value does not exist in the global hash lookup table (e.g., a miss), the process may continue to 1010.

At 1028, the process may respond to a global hash lookup table hit by buffering a duplicate header for the current data in a global data buffer. In other words, because the global hash lookup table search resulted in a hit, the current data has been buffered or stored previously in the global buffer or in the global storage space. As such, a duplicate header is buffered in the global buffer with information that may associate the duplicate header with the previously buffered or stored data piece in the global buffer or storage space. The process may then continue to 1030.

At 1010, the process may respond to a global hash lookup table miss by buffering a header along with the current data for storage in the local storage space. In other words, because the global hash lookup table search resulted in a miss, the process may determine that the current data has not been locally buffered, globally buffered or previously stored in the global storage space. The hash value of the current data piece may also be added to the local hash lookup table.

At 1012, the process may determine whether the local buffer is full. If so, the process may continue to 1014. Otherwise, the process may return to 1004 and process another data piece.

At 1014, the locally buffered information may be reordered so that duplicates may be grouped together. For example, for a group of duplicates, the header and data piece may be ordered to be first of a group, followed by the duplicate headers that are associated with the data piece.

Next, at 1016, the process may determine a count of occurrences for each group of duplicates in the reordered buffer. The process may then select frequently occurring data contents. For example, the process may select data contents that occurred more than a threshold number of times as frequently occurring data contents.

At 1018, the reordered buffer data may be written to the storage device. To the extent possible, the writing may be performed to place an entire group in the same storage unit (e.g. ECC unit). In some cases, an entire group may not fit into a storage unit or the remaining space in a current storage unit. In some examples, the process may subdivide the group (e.g. where the group will not fit into a full storage unit) or write the next group in the buffer to a current storage unit and store the current group in a next storage unit (e.g. where the current group will fit in an entire storage unit but the current storage unit has insufficient remaining space).

At 1020, the process may buffer copies of data contents selected as frequently occurring in a global buffer. In addition, a global hash lookup table may be updated by adding hash values for each of the data contents added to the global buffer.

At 1022, the FTL mapping table may be updated based on the written data.

Following the update of the FTL mapping table, at 1024, the local hash lookup table may be reset for use with the next set of buffered data pieces. Following 1024, the process may continue to 1030.

At 1030, the process may determine whether the global buffer has buffered a maximum number of pieces. If so, the process may continue to 1032. Otherwise, the process may return to 1004 and process another data piece.

At 1032, the globally buffered information may be reordered so that duplicates may be grouped together. For example, for a group of duplicates, the global header and data content may be ordered to be first of a group, followed by the duplicate headers that are associated with the data piece. In the case of the global header and data content, the global header may be similar to headers generated for the local storage case except that the global header may not include an LBA or the LBA included in the header may have an invalid value. This may be to avoid causing an error during garbage collection.

At 1034, the reordered global buffer data may be written to the storage device in a global storage space. To the extent possible, the writing may be performed to place an entire group in the same storage unit (e.g. ECC unit). In some cases, an entire group may not fit into a storage unit or the remaining space in a current storage unit. In some examples, the process may subdivide the group (e.g. where the group will not fit into a full storage unit) or write the next group in the buffer to a current storage unit and store the current group in a next storage unit (e.g. where the current group will fit in an entire storage unit but the current storage unit has insufficient remaining space).

At 1036, the FTL mapping table may be updated based on the data written to the global storage space. Following the update of the FTL mapping table, at 1038, the global hash lookup table may be reset to for use with the next set of buffered data pieces that may frequently occur. Following 1038, the process may return to 1004 and process another data piece.

As discussed above, RLDD-SGD may allow for selective global duplication checks and may store data pieces into ECC units designated as global storage space in the same manner as RLDD may store data to the local storage space. While discussed herein in conjunction with RLDD, the SGD scheme disclosed herein may be used alone or with other data deduplication schemes.

All steps listed for the methods 300, 700 and 1000 may be applied to systems that utilize data deduplication. Many variations would be apparent in view of this disclosure. For example, instead of a threshold, some embodiments may select a number (e.g. a predetermined number) of data pieces which are the most frequently occurring data pieces. In a particular example, some embodiments may select the top three most frequently occurring data pieces to be selectively deduplicated, regardless of whether the number of times the most three most frequently occurring data pieces occurred above a threshold value. Components and circuits used to perform the operations in the method may be discrete, integrated into a system on chip (SOC), or other circuits. Further, the steps can be carried out in a processor (e.g. a digital signal processor), implemented in software, implemented via firmware, or by other means.

FIG. 11 is a block diagram that illustrates an example 1100 of data storage with reordered local data deduplication based selective global deduplication (RLDD-SGD) according to some embodiments herein.

As shown, an ECC unit 1102 has been written with three headers, header 1 1104 and header 2 1106 which may be associated with data 1 1110 and header 3 1108 which may be associated with data 2 1112. As illustrated, the local hash lookup table 1014 at the time ECC unit 1102 was written may include H1 1116 (e.g. the hash for data 1 1110) and H2 1118 (e.g. the hash for data 2 1112). In the illustrated example of FIG. 11, it may be assumed that the threshold number of duplicates to trigger global storage of data contents is two (2). As such, as shown in FIG. 11, after the processing of ECC unit 1102 which may correspond to PBA1 and before the processing of ECC unit 1130 which may correspond to PBA30, a global header 1' 1122 and a global copy of data 1 1124 may be written to global storage 1120. As discussed above, the global hash lookup table 1126 may also be updated with a copy of the hash value H1' 1128 of data 1 1124. Also, the global header 1' 1122 may include an invalid LBA1' or may not include a LBA field.

When the ECC unit 1130 is being processed, data 7 1134 may be determined to be absent from both the local and global storage spaces by checking the local hash lookup table 1136 and global hash lookup table 1126 for the hash value of data 7 1134. As such, the header 7 1132 and data 7 1134 may be included in ECC unit 1130 and the local hash lookup table 1136 may be updated with a copy of the hash value H7 1138 of data 7 1134.

On the other hand, the hash value of data 8 (not shown) may be determined to be absent from the local hash lookup table 1136 but present in the global hash lookup table 1126. As such, header 8 1140 may be stored (or buffered for storage) in the global storage 1120. In the case of the duplicate headers stored in the global storage space 1120, a valid LBA (e.g. LBA 8) may be included in the header to associate the header with the corresponding LBA.

It should be noted that the example of FIG. 11 does not illustrate the global storage 1120 subdivided into ECC units. However, this is for convenience, ease of illustration, and is not limiting on embodiments of the subject matter disclosed herein. In addition, buffer triggers, such as the decisions at 1012 and 1030 discussed above are not limiting and other criteria may be used. For example, the global buffer decision at 1030 may include an additional or different criterion such as a maximum number of data pieces processed since a previous writing to global storage space.

Figure 12:
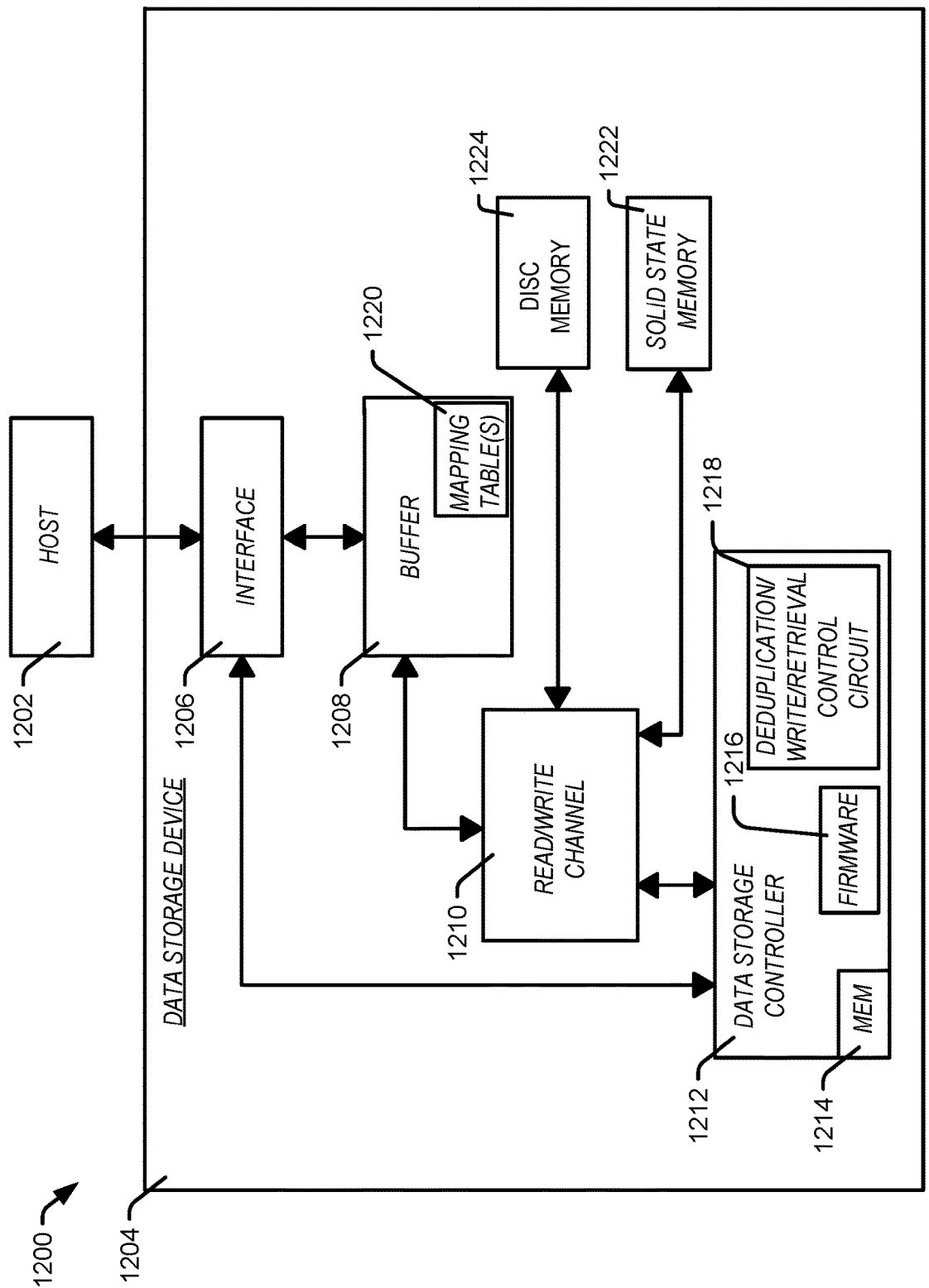
FIG. 12 is a block diagram of a system including a storage device with data deduplication, in accordance with certain embodiments of the present disclosure.

Referring to FIG. 12, a diagram of a system including a storage device with data deduplication according to some embodiments herein is shown and generally designated 1200. In some examples, the system 1200 may implement the schemes and functions described herein. A data storage device ("DSD") 1204 can optionally connect to be removable from a host device 1202, which can be a computer, a host bus adapter, a bus expander, a server, a telephone, a music player, another electronic device, or any combination thereof. The DSD 1204 can communicate with the host device 1202 via the hardware and firmware based host interface circuit 1206 that may include a connector that allows the DSD 1204 to be physically connected and physically disconnected from the host device 1202.

The DSD 1204 can include a data storage controller 1212, which can include associated memory 1214, firmware 1216, and a deduplication/write/retrieval control circuit (DWRC) 1218. A buffer 1208 can temporarily store data during read and write operations. In some cases, the buffer 1208 can be a volatile memory, such as DRAM, SRAM, or other volatile memory. In some examples, the DWRC 1218 may perform mapping between LBA addresses and the physical addresses and deduplication operations as discussed above (e.g. as discussed above with respect to FIGS. 1-11). The firmware 1216 may have instructions that when executed by the controller 1212, cause the controller 1212 to perform certain functions, such as mapping table lookups, mapping table entry modifications, or other tasks. The mapping table 1220 may include logical block address ("LBA") to physical address mappings corresponding to the data stored by the DSD 1204, for example, in the solid state memory (SSM) 1222. Further, the DSD 1204 can include a read/write (R/W) channel 1210 which can encode data during write operations and decode data during read operations. The R/W channel 1210 may be coupled to an SSM 1222, and a disc memory 1224.

The DWRC 1218 may perform data deduplication, write and read operations with regard to data stored or to be stored in the SSM 1222. The mapping table 1220 may include information about where in the SSM 1222 data is stored. When data in the SSM 1222 is accessed, mapping table entries in the mapping table 1220 may be utilized by the DWRC 1218 to determine the physical location of the data, and which may be provided to the data storage controller 1212. The data storage controller 1212 can execute instructions of the firmware to cause the data storage controller 1212 to determine a location of the data based on the mapping table entries.

When data is stored to the SSM 1222, the data storage controller 1212 may determine a storage location for the data. The DWRC 1218 may determine the physical address of the storage location for the data storage controller 1212. In addition, the DWRC 1218 may perform the operations of LDD, RLDD and RLDD-SGD discussed above. In turn, the data storage controller 1212 can update mapping table entries in the mapping table 1220. For example, the mapping table entries may be stored to the mapping table 1220 by the data storage controller 1212, such as via the R/W channel 1210.

The illustrations, examples, and embodiments described herein are intended to provide a general understanding of the structure of various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, the figures and above description provide examples of architecture and voltages that may be varied, such as for design requirements of a system. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above examples, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A device comprising:
    a solid state data storage device (SSD) having multiple local storage units and at least one global storage space, the SSD including:
        a data storage controller configured to:
            determine if first data received at the SSD is a duplicate of second data already stored at the SSD;
            implement selective global deduplication including copying selected data to the global storage space when a count of a number of occurrences of duplicates of the selected data is above a threshold;
            buffer a duplicate header for the selected data in a global data buffer; and
            implement local data deduplication at a local level of one or more of the local storage units for duplicate data the selective global deduplication has not been implemented for.

2. The device of claim 1 further comprising the data storage controller configured to determine duplicate data by generating a hash signature for the first data and comparing the hash signature to a local hash lookup table of hash signatures corresponding to data currently stored at one or more local storage spaces of the SSD.

3. The device of claim 2 further comprising the data storage controller configured to, when the local hash lookup table does not contain a match of a specific hash value, compare the hash signature to a global hash lookup table of hash signatures corresponding to data currently stored in the global storage space.

4. The device of claim 3 further comprising the data storage controller configured to, when the hash signature does match a hash value in the global hash lookup table, buffer a duplicate header corresponding to the first data in the global storage space, the duplicate header including information that associates the duplicate header with the second data previously stored in the global buffer.

5. The device of claim 4 further comprising the data storage controller configured to reorder the global storage buffer such that specific global data contents in the global storage buffer are grouped near headers associated with the specific global data contents.

6. The device of claim 3 further comprising the data storage controller configured to, when the hash signature does not match any hash value in the global hash lookup table, buffer the first data in a local storage buffer and adding the hash signature to the local hash lookup table.

7. The device of claim 6 further comprising the data storage controller configured to reorder the local storage buffer such that specific data contents in the local storage buffer are grouped near headers associated with the specific data contents.

8. The device of claim 7 further comprising the data storage controller configured to store data in the local storage buffer to storage units of the SSD such that specific data in the local storage buffer are stored in a same storage unit of the storage units as the headers associated with the specific data contents.

9. The device of claim 8 further comprising the data storage controller configured to:
move the selected data from a local storage space to the global storage buffer when the number of occurrences of the selected data is above the threshold;
determine if moving the selected data puts the global storage buffer over a threshold storage amount; and
when moving the selected data puts the global storage buffer over the threshold storage amount, move contents of the global storage buffer to one or more storage units of the SSD.

10. The device of claim 8 further comprising an interface configured to communicate with a host device and receive a write operation from the host, the write operation corresponding to the first data.

11. An apparatus comprising:
a data storage controller configured to manage read and write operations for a solid state data storage device (SSD) that includes multiple local storage units and at least one global storage space, the data storage controller further configured to:
determine if first data received at the SSD is a duplicate of second data already stored at the SSD;
implement selective global deduplication including copying selected data to the global storage space when a count of a number of occurrences of duplicate write requests is above a threshold;
buffer a duplicate header for the selected data in a global data buffer; and
implement local data deduplication at a local level of one or more of the local storage units for duplicate data the selective global deduplication has not been implemented for.

12. The apparatus of claim 11 further comprising:
the data storage controller configured to determine duplicate data by generating a hash signature for the first data and comparing the hash signature to a local hash lookup table of hash signatures corresponding to data currently stored at one or more local storage spaces of the SSD; and
the data storage controller configured to, when the local hash lookup table does not contain a match of a specific hash value, compare the hash signature to a global hash lookup table of hash signatures corresponding to data currently stored in the global storage space.

13. The apparatus of claim 12 further comprising the data storage controller configured to, when the hash signature does match a hash value in the global hash lookup table, buffer a duplicate header corresponding to the first data in the global storage space, the duplicate header including information that associates the duplicate header with the second data previously stored in the global buffer.

14. The apparatus of claim 12 further comprising the data storage controller configured to, when the hash signature does not match any hash value in the global hash lookup table, buffer the first data in a local storage buffer and adding the hash signature to the local hash lookup table.

15. The apparatus of claim 11 further comprising the data storage controller configured to:
reorder the local storage buffer such that specific data contents in the local storage buffer are grouped near headers associated with the specific data contents;
store data in the local storage buffer to storage units of the SSD such that specific data in the local storage buffer are stored in a same storage unit of the storage units as the headers associated with the specific data contents;
move the selected data from a local storage space to the global storage buffer when the number of occurrences of the selected data is above the threshold;
determine if moving the selected data puts the global storage buffer over a threshold storage amount; and
when moving the selected data puts the global storage buffer over the threshold storage amount, move contents of the global storage buffer to one or more storage units of the SSD.

16. A device comprising:
a solid state memory device (SSD) that includes multiple local storage units and at least one global storage space;
means for performing a data deduplication operation for the SSD, the data deduplication operation including:
determining if first data received at the SSD is a duplicate of second data already stored at the SSD;
implementing selective global deduplication including copying selected data to the global storage space when a count of a number of occurrences of duplicate write requests is above a threshold;
buffering a duplicate header for the selected data in a global data buffer; and
implementing local data deduplication at a local level of one or more of the local storage units for duplicate data the selective global deduplication has not been implemented for.

17. The device of claim 16 further comprising the data deduplication operation including:
determining duplicate data by generating a hash signature for the first data and comparing the hash signature to a local hash lookup table of hash signatures corresponding to data currently stored at one or more local storage spaces of the SSD; and
comparing the hash signature to a global hash lookup table of hash signatures corresponding to data currently stored in the global storage space when the local hash lookup table does not contain a match of a specific hash value.

18. The device of claim 17 further comprising the data deduplication operation including buffering a duplicate header corresponding to the first data in the global storage space when the hash signature does match a hash value in the global hash lookup table, the duplicate header including information that associates the duplicate header with the second data previously stored in the global buffer.

19. The device of claim 16 further comprising the data deduplication operation including buffering the first data in a local storage buffer and adding the hash signature to the local hash lookup table when the hash signature does not match any hash value in the global hash lookup table.

20. The device of claim 19 further comprising the data deduplication operation including:
  reordering the local storage buffer such that specific data contents in the local storage buffer are grouped near headers associated with the specific data contents;
  storing data in the local storage buffer to storage units of the SSD such that specific data in the local storage buffer are stored in a same storage unit of the storage units as the headers associated with the specific data contents;
  moving the selected data from a local storage space to the global storage buffer when the number of occurrences of the selected data is above the threshold;
  determining if moving the selected data puts the global storage buffer over a threshold storage amount; and
  moving contents of the global storage buffer to one or more storage units of the SSD when moving the selected data puts the global storage buffer over the threshold storage amount.

* * * * *